(12) United States Patent
Karthikeyan et al.

(10) Patent No.: US 10,700,962 B2
(45) Date of Patent: Jun. 30, 2020

(54) COMMUNICATIONS NETWORK

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS PUBLIC LIMITED COMPANY, Londong (GB)

( * ) Notice: Subject to any disclaimer, the term of this patent is extended or adjusted under 35 U.S.C. 154(b) by 0 days.

(21) Appl. No.: 15/740,837

(22) PCT Filed: Jun. 30, 2016

(86) PCT No.: PCT/EP2016/065431
§ 371 (c)(1),
(2) Date: Dec. 29, 2017

(87) PCT Pub. No.: WO2017/001629
PCT Pub. Date: Jan. 5, 2017

(65) Prior Publication Data
US 2018/0191606 A1 Jul. 5, 2018

(30) Foreign Application Priority Data

Jun. 30, 2015 (EP) .................................... 15275166
Sep. 28, 2015 (EP) .................................... 15187163

(51) Int. Cl.
*H04L 12/725* (2013.01)
*G06N 20/00* (2019.01)
(Continued)

(52) U.S. Cl.
CPC ........... *H04L 45/302* (2013.01); *G06N 20/00* (2019.01); *H04L 41/5025* (2013.01); *H04L 43/0852* (2013.01); *H04L 45/308* (2013.01)

(58) Field of Classification Search
CPC ..................................................... H04L 45/308
See application file for complete search history.

(56) References Cited

U.S. PATENT DOCUMENTS 6,631,135 B1  10/2003  Wojcik
6,690,929 B1   2/2004  Yeh
(Continued)

FOREIGN PATENT DOCUMENTS

EP    1 016 261    7/2000
EP    1 374 486    1/2004
(Continued)

OTHER PUBLICATIONS

International Search Report of PCT/EP2016/065431, dated Sep. 23, 2016, 3 pages.
(Continued)

*Primary Examiner* — Kevin M Cunningham
(74) *Attorney, Agent, or Firm* — Nixon & Vanderhye PC

(57) ABSTRACT

A method of operating a communications network, in which a primary learning process periodically determines which routes communications sessions are assigned to in order that the session can be carried with a requested QoS. A secondary learning process is used, in between instances of the primary learning process to check that the QoS constraints are still satisfied. If not, action is taken, for example using a load balancer to transmit the session over one or more further network routes.

11 Claims, 2 Drawing Sheets

(51) Int. Cl.
  *H04L 12/24*  (2006.01)
  *H04L 12/26*  (2006.01)

(56) References Cited

U.S. PATENT DOCUMENTS

| | | | |
|---|---|---|---|
| 7,668,946 B1 | 2/2010 | Garcia-Franco et al. | |
| 7,715,312 B2 | 5/2010 | Khasnabish | |
| 8,073,455 B1 | 12/2011 | Xie et al. | |
| 2001/0013067 A1 | 8/2001 | Koyanagi et al. | |
| 2003/0112762 A1 | 6/2003 | Hasan Mahmoud et al. | |
| 2004/0120705 A1 | 6/2004 | Friskney et al. | |
| 2005/0083849 A1 | 4/2005 | Rui et al. | |
| 2005/0102414 A1 | 5/2005 | Hares et al. | |
| 2006/0187817 A1 | 8/2006 | Charzinski et al. | |
| 2007/0230363 A1 | 10/2007 | Buskens et al. | |
| 2007/0268827 A1* | 11/2007 | Csaszar | H04L 43/026 370/232 |
| 2008/0065318 A1 | 3/2008 | Ho | |
| 2008/0232247 A1* | 9/2008 | Evans | H04L 45/00 370/228 |
| 2010/0214920 A1 | 8/2010 | Tewani et al. | |
| 2010/0265826 A1 | 10/2010 | Khasnabish | |
| 2011/0087522 A1 | 4/2011 | Beaty et al. | |
| 2013/0144550 A1 | 6/2013 | Czompo | |
| 2013/0275567 A1 | 10/2013 | Karthikeyan et al. | |
| 2013/0275589 A1 | 10/2013 | Karthikeyan et al. | |
| 2013/0311673 A1* | 11/2013 | Karthikeyan | H04L 41/147 709/239 |
| 2014/0046880 A1 | 2/2014 | Breckenridge | |
| 2014/0052850 A1 | 2/2014 | Doorhy et al. | |
| 2015/0074283 A1 | 3/2015 | Karthikeyan et al. | |
| 2015/0098338 A1 | 4/2015 | Bhattacharya | |
| 2015/0332155 A1 | 11/2015 | Mermoud | |
| 2015/0381648 A1 | 12/2015 | Mathis | |
| 2016/0171398 A1 | 6/2016 | Eder | |
| 2016/0344604 A1* | 11/2016 | Raleigh | H04L 43/0876 |
| 2018/0191606 A1 | 7/2018 | Karthikeyan et al. | |
| 2018/0191621 A1 | 7/2018 | Karthikeyan | |
| 2018/0191635 A1 | 7/2018 | Karthikeyan | |

FOREIGN PATENT DOCUMENTS

| | | |
|---|---|---|
| EP | 1 401 161 A2 | 3/2004 |
| EP | 1 875 693 | 1/2008 |
| EP | 1 993 231 A1 | 11/2008 |
| EP | 2 151 951 A2 | 2/2010 |
| EP | 2 261 811 | 12/2010 |
| EP | 2 469 756 | 6/2012 |
| EP | 1 875 693 | 8/2012 |
| WO | 99/14931 | 3/1999 |
| WO | 02/080458 A1 | 10/2002 |
| WO | 2006/116308 A2 | 11/2006 |
| WO | WO 2011/076282 | 6/2011 |
| WO | 2012/085520 A1 | 6/2012 |
| WO | 2012/085521 A1 | 6/2012 |
| WO | 2013/144550 | 10/2013 |
| WO | 2014/068270 A1 | 5/2014 |
| WO | WO 2014/068268 | 5/2014 |
| WO | 2017/001628 | 1/2017 |
| WO | 2017/001629 | 1/2017 |

OTHER PUBLICATIONS

Search Report dated Apr. 27, 2016 issued in GB1517110.1 (7 pgs.).
International Search Report and Written Opinion of the International Searching Authority dated Sep. 23, 2016, issued in International Application No. PCT/EP2016/065431 (13 pgs.).
U.S. Appl. No. 15/740,832, filed Dec. 29, 2017 (29 pgs.).
Examination Report issued in EP Application No. 16 733 597.5 dated Sep. 12, 2019 (9 pages).
Ananya Das "Maximizing Profit Using SLA-Aware Provisioning", 2012 IEEE Network Operations and Management Symposium (NOMS), Math & Computer Science Department, Lake Forest College, Apr. 16, 2012 (8 pages).
International Search Report of PCT/EP2016/065429, dated Sep. 5, 2016, 4 pages.
Extended European Search Report dated Nov. 26, 2015 issued in European Application No. 15275166.5 (5 pgs.).
International Search Report and Written Opinion of the International Searching Authority dated Sep. 5, 2016 issued in International Application No. PCT/EP2016/065429 (16 pgs.).
Tanja Zseby and Sebastian Zander, "Sampling Schemes for Validating Service Level Agreements", Centre for Advanced Internet Architectures, CAIA Technical Report 040706A, Jul. 2004 (6 pgs.).
Krishna Kumar Balaraman, "Application of Data Mining in the Telecommunication Industry", Term Paper, Indian Institute of Management Bangalore, Oct. 22, 2011 (23 pgs.).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pgs.).
Search Report dated Apr. 27, 2016 issued in GB1517110.1 (7 pages).
International Search Report and Written Opinion of the International Searching Authority dated Sep. 23, 2016, issued in International Application No. PCT/EP2016/065431 (13 pages).
U.S. Appl. No. 15/740,837, filed Dec. 29, 2017 (33 pgs.).
U.S. Appl. No. 15/740,520, filed Dec. 28, 2017 (30 pgs.).
International Search Report of PCT/EP2016/065434, dated Oct. 6, 2016, 4 pagesrui.
Valikannu "A Novel Energy Consumption Model using Residual Energy Based Mobile Agent Selection Scheme (REMA) in MANETs", 2015 $2^{nd}$ International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
Office Action dated Oct. 17, 2018 issued in U.S. Appl. No. 15/740,832 (11 pgs.).
Office Action dated Apr. 19, 2019 issued in U.S. Appl. No. 15/740,832 (12 pgs.).
Advisory Action dated Aug. 2, 2019 issued in U.S. Appl. No. 15/740,832 (4 pgs.).
Office Action dated Nov. 2, 2018 issued in U.S. Appl. No. 15/740,520 (13 pgs.).
Office Action dated May 30, 2019 issued in U.S. Appl. No. 15/740,520 (16 pgs.).
Office Action dated Mar. 4, 2020 issued in U.S. Appl. No. 15/740,520 (19 pgs.).
Office Action dated Nov. 13, 2019 issued in U.S. Appl. No. 15/740,832 (12 pgs.).
Advisory Action dated Oct. 8, 2019, issued in U.S. Appl. No. 15/740,520 (3 pages).

* cited by examiner

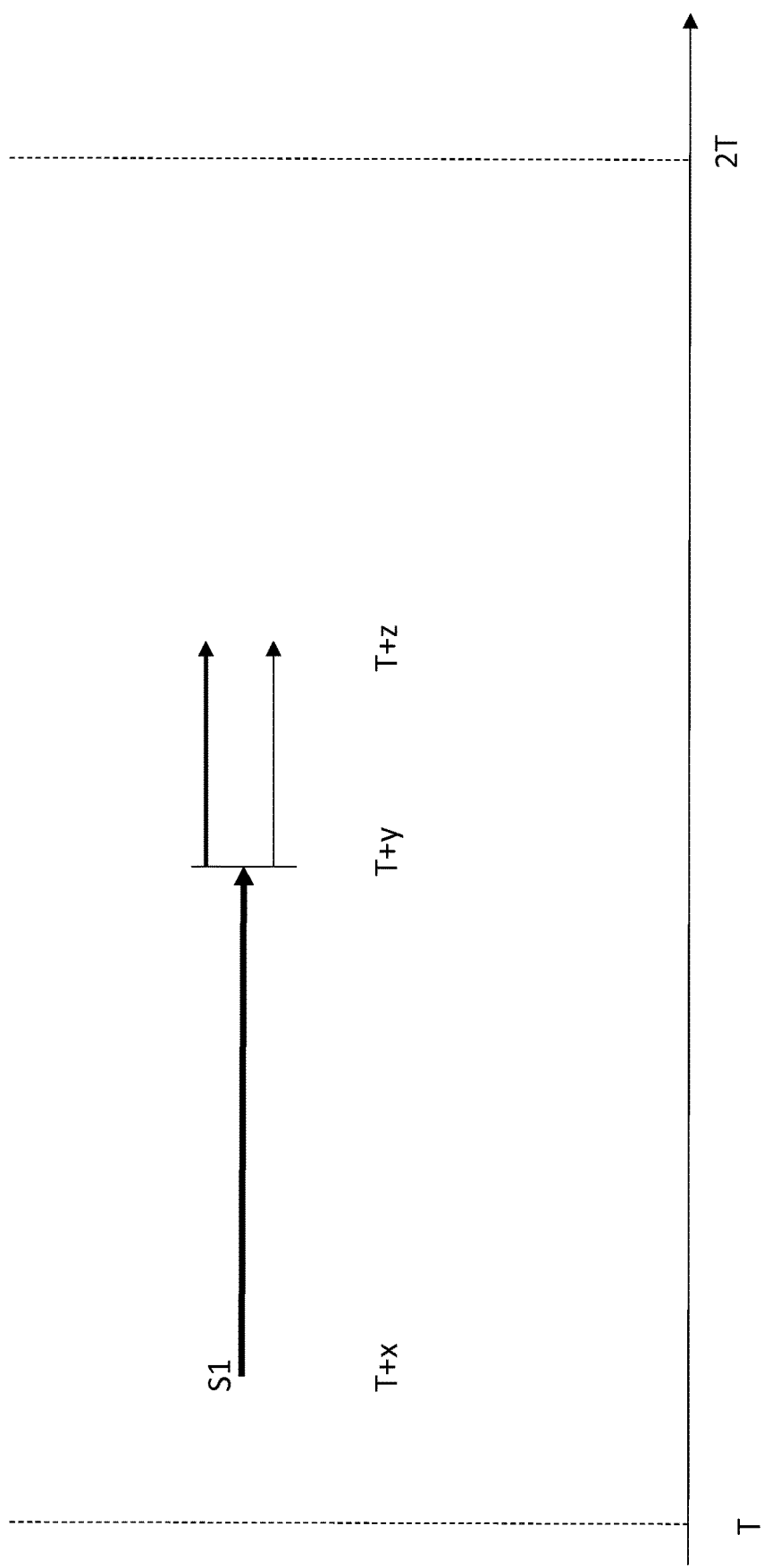

COMMUNICATIONS NETWORK

This application is the U.S. national phase of International Application No. PCT/EP2016/065431 filed Jun. 30, 2016, which designated the U.S. and claims priority to EP Patent Application No. 15275166.5 filed Jun. 30, 2015 and EP Patent Application 15187163.9 filed Sep. 28, 2015, the entire contents of each of which are hereby incorporated by reference.

FIELD OF THE INVENTION

The present invention relates to methods of operating communications networks and in particular to the operation of networks whilst ensuring that quality of service provision is maintained.

BACKGROUND TO THE INVENTION

There are two main ways for network operators to provide granular performance guarantees: Integrated Services (IntServ) and Differentiated Services (DiffServ). Whilst IntServ has suffered from scalability challenges, DiffServ has become popular. Within the DiffServ framework, operators choose to provide various Classes of Service (CoS) such as Expedited Forwarding (EF), Assured Forwarding (AF) and Best Effort (DE) delivery, each of which corresponds to different Quality of Service (QoS) promises. For example, an operator can choose to offer within a single country 20 ms of round trip delay, 99.9% packet delivery rate and a jitter of 2 ms for a CoS like EF. Consumers, i.e. service providers that deliver data over the networks, purchase a specified throughput through the network in advance with pre-defined characteristics for which they expect pre-agreed Service Level Agreements (SLAs). Performance is monitored on the network and should performance drop below the promised targets, the network operator might have to compensate for this breach using a credit system or similar. The data packets that enter the network from the client (either a single client or a group of clients) are marked with the appropriate CoS in the traffic in the Type of Service (ToS) field or in the Differentiated Services Code Point (DSCP) field by the client themselves or an edge device managed by the operator.

The applicant's co-pending international patent application WO2014/068268 discloses a method in services are re-mapped to a different class of service based on predictive analytics on network performance for all the available classes of service. However, this proposal still adhered to the 5 major classes of services (EF, AF1, AF2, AF3, DE) for re-mapping. In the ensuing discussion the conventional EF/AFx/DE DiffServ model will be referred to as classic DiffServ to distinguish its behaviour from the adaptive QoS model of the present application.

The learning process can result in drastic changes for the network from one iteration to the next. Each time a new set of DSCP values and associated QoS models are advertised, previous sets are discontinued. This is a result of the classification mechanism using historical data from the preceding learning interval—if a CoS was determined to be unsustainable in the preceding learning interval, this CoS will not be advertised after the current learning iteration. This situation arises due to one of two reasons: the network is unable to guarantee the required QoS or the network policies have required the primary learning process to no longer use the specific QoS SLA as a cluster centre. Whilst new sessions are not disadvantaged by this method, existing services must be remapped into the new set of classes of service. Also, the learning method can be computationally intensive and therefore take a significant amount of time to re-learn cluster centres and route profiles. In the intermediate time where network data about service performance is still being collected, this network data remains unused till the next iteration of the learning algorithm, which could be, for example, every hour or every day. Service sessions themselves could last shorter time periods and/or might benefit from more frequent monitoring with respect to adherence to promised SLA when the session was admitted. Two limitations are hence identified: QoS remains unmonitored in the shorter term between iterations of route classification and the time-variance of CoS causes continuity challenges for existing services.

Such challenges arise in a more general context where time variation due to periodic learning intervals results in drastic disruptions to continuity in stateful systems as well as periods where monitoring cannot take place because the primary learning process is still consuming data from the previous interval. Learning methods that are fully 'real-time' are unlikely to suffer from this challenge but it might not be possible to have such a learning method due to the processing time required to consume and analyse the vast amount of data in a single iteration. Therefore, in this particular application, not only is the frequency of monitoring less than we would like in order to identify QoS breaches but statefulness can be lost due to services still marking their packets for an expired CoS over a longer session, expecting this SLA to be delivered, even after the QoS model has been discontinued.

There are two main ways for network operators to provide granular performance guarantees: Integrated Services (IntServ) and Differentiated Services (DiffServ). Whilst IntServ has suffered from scalability challenges, DiffServ has become popular. Within the DiffServ framework, operators choose to provide various Classes of Service (CoS) such as Expedited Forwarding (EF), Assured Forwarding (AF) and Best Effort (DE) delivery, each of which corresponds to different Quality of Service (QoS) promises. For example, an operator can choose to offer within a single country 20 ms of round trip delay, 99.9% packet delivery rate and a jitter of 2 ms for a CoS like EF. Consumers, i.e. service providers that deliver data over the networks, purchase a specified throughput through the network in advance with pre-defined characteristics for which they expect pre-agreed Service Level Agreements (SLAs). Performance is monitored on the network and should performance drop below the promised targets, the network operator might have to compensate for this breach using a credit system or similar. The data packets that enter the network from the client (either a single client or a group of clients) are marked with the appropriate CoS in the traffic in the Type of Service (ToS) field or in the Differentiated Services Code Point (DSCP) field by the client themselves or an edge device managed by the operator.

The applicant's co-pending international patent application WO2014/068268 discloses a method in services are re-mapped to a different class of service based on predictive analytics on network performance for all the available classes of service. However, this proposal still adhered to the 5 major classes of services (EF, AF1, AF2, AF3, DE) for re-mapping. In the ensuing discussion the conventional EF/AFx/DE DiffServ model will be referred to as classic DiffServ to distinguish its behaviour from an adaptive QoS model, such as that disclosed by WO2014/068268.

SUMMARY OF THE INVENTION

According to a first aspect of the invention, there is provided a method of operating a communications network, the method comprising the steps of: a) executing a first learning process to allocate a communication session to one or more of a plurality of routes through the communications network, the allocation of a session to a network route being made in accordance with a requested quality of service (QoS) measure; b) subsequently executing a second learning process to determine if the QoS measure will be breached prior to a further instance of the first learning process being executed; and c) if the result of the second learning process indicates that the QoS measure will be breached, re-allocating the communication session to one or more further routes through the communications network wherein the one or more further routes are able to satisfy the requested QoS measure.

If the result of the second learning process indicates that the QoS measure will be breached then the communication session may be divided into two or more parts, with each of the session parts being re-allocated to a respective further route through the communications network. The second learning process may re-allocate the communication session to one or more further routes through the communications network which have the same class of service as the routes to which the session was allocated in the first learning process. The second learning process may re-allocate the communication session to one or more further routes through the communications network which have a different class of service from the routes to which the session was allocated in the first learning process, but for which it is predicted that the requested QoS measure can be satisfied until the next instance of the first learning process is executed. The second learning process may be executed more than once in between successive instances of the first learning process.

The method may comprise the further step of d) if in step c) there are no further routes through the communications network which can satisfy the requested QoS measure, making no further change to the communication session. Alternatively, the communication session may be terminated or re-allocated to one or more further communication routes which can provide an improved quality of service.

According to a second aspect of the present invention there is provided a data carrier device comprising computer executable code for performing a method as described above.

According to a third aspect of the present invention there is provided an apparatus configured to, in use, perform a method as described above.

According to a fourth aspect of the present invention there is provided a communications network comprising a plurality of nodes, a plurality of communications links interconnecting the plurality of nodes, and a network gateway, the communications network being configured to, in use, perform a method as described above.

BRIEF DESCRIPTION OF THE FIGURES

In order that the present invention may be better understood, embodiments thereof will now be described, by way of example only, with reference to the accompanying drawings in which:

FIG. 2 shows a graphical depiction of the operation of the primary learning process.

DETAILED DESCRIPTION OF EMBODIMENTS

Figure 1:
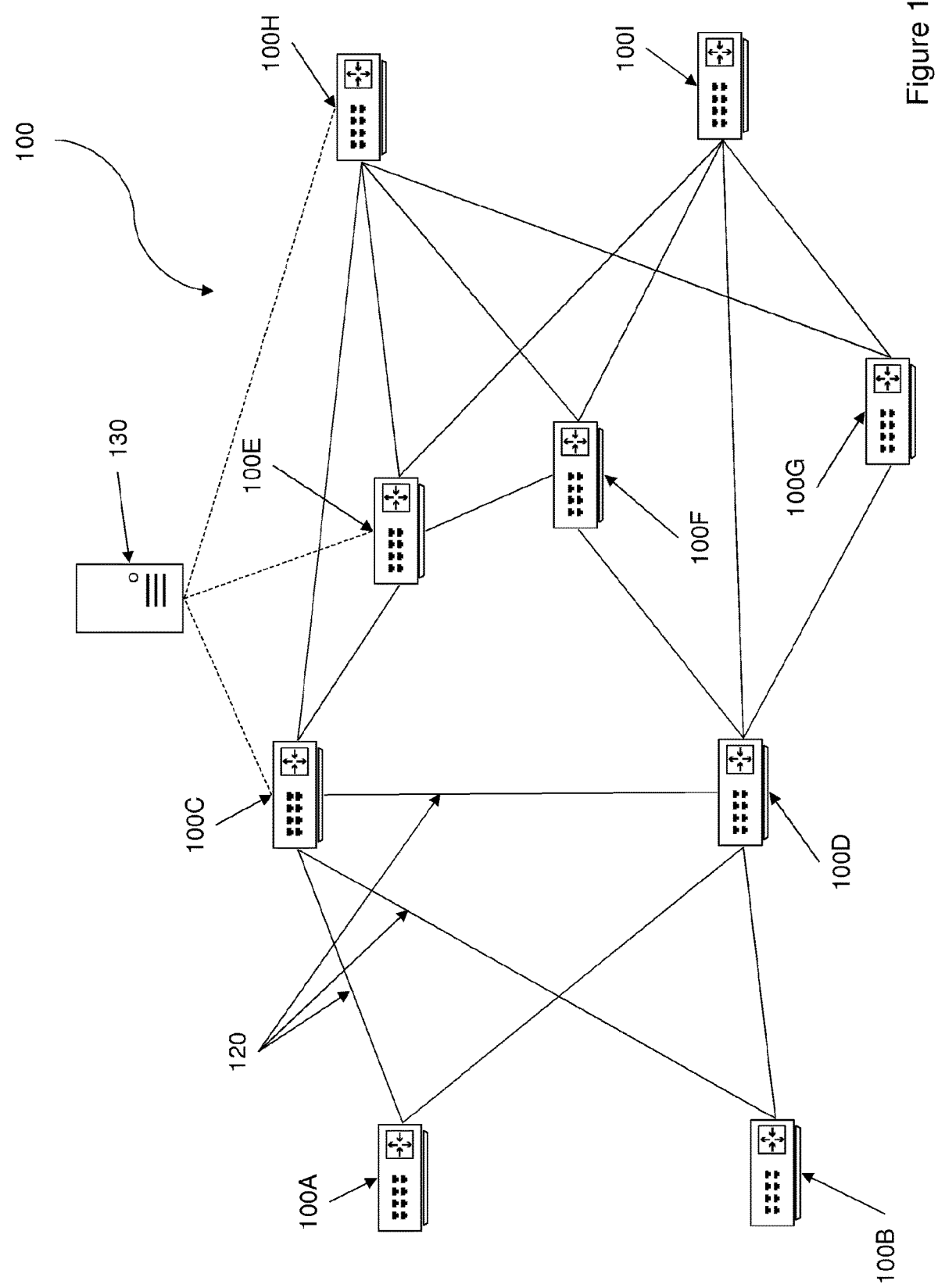
FIG. 1 shows a schematic depiction of a communications network 100 according to an embodiment of the present invention.

FIG. 1 shows a schematic depiction of a communications network 100 according to an embodiment of the present invention. The communications network 100 comprises a plurality of routers 100A, 100B, 100C, ..., 100I. Communications links 120 provide interconnections between a first router and a second router. It will be understood that each of the plurality of routers are not connected to all of the other routers which comprise the network. FIG. 1 shows that routers 100A and 100B form a first edge of the network, Similarly, routers 100H and 100I form a second edge of the network. These routers may be referred to as edge routers. Requests to establish a session through the network, such that data might be transmitted across the network, may be received at the edge routers at the first edge or the second edge of the network. The routers 100C, 100D, 100E, 100F & 100G will receive data which has originated from a first edge router and which is destined to the be routed to a second edge router. These routers may be referred to as core routers. The network further comprises a network gateway 130 which manages the performance of the routers and accepts, or rejects, requests to admit sessions to the network. More specifically, the network gateway learns performance models from historic traffic data carried over the communications network, assigns performance models to routes through the network and monitors and manages performance models throughout their life cycle.

In one example, a performance model may comprise a three-dimensional performance-based model comprising of jitter J, loss L and delay D. Each performance model $P_i$ can be characterised by a prototype vector $$p_i = (j_i, l_i, d_i) \quad [1]$$

and a 99% confidence interval vector $$c_i = (cj_i, cl_i, cd_i) \quad [2]$$

The prototype vector $p_i$ specifies the typical or average performance of the parameters which comprise the model and the confidence vector $c_i$ specifies the 99% confidence interval p±c for each component p of $p_i$ (it will be understood that other confidence intervals or other determinations of parameter variability may be used). The advantage of this representation over an interval based representation is that we can easily determine the distance of the current performance of a transmission to any performance model. We can also evaluate the consistency or value of a performance model, i.e. smaller confidence intervals indicate that we will see less deviation from the desired performance.

Instead of a confidence interval, we can also use a quantile, e.g. the 99% percentile. This will indicate that 99% of the measured performance values will be within a certain threshold, i.e. p<c for 99% of all values. This may be sufficient for a client who wants to know what the worst case performance of the transmission could be, but it is less useful for an operator who may want to define performance intervals that are clearly separated from each other.

Instead of directly exposing the vector $c_i$ to clients the operator can also choose to use a different type of interval or threshold around the prototype, for example a deviation of less than x % per component and publish that to clients. The confidence vector is then only used internally by the network in order to decide if a prototype is stable enough to constitute a performance model.

Performance models may be identified by means of cluster analysis applied to transmission performance data which has been obtained from the end to end traffic that has been admitted into the network. Each transmission $T_k$ may be represented by a vector $t_k=(j_k, l_k, d_k)$ specifying, for example, the average jitter, loss and delay parameter values observed over the period of the transmission (it will be understood that the traffic performance may be characterised using other metrics in addition to, or as an alternative to, jitter, loss and delay). Cluster analysis will discover the natural groupings in the traffic and learn a number of model prototype vectors $p_i$. The 99% confidence interval p±c for a component p of a prototype vector p is computed by $$c = \frac{2.58}{\sqrt{n}} s \quad [3]$$

where s is the standard deviation of the sample used to compute the prototype component and n is the sample size. We assume that a prototype vector is the component-wise arithmetical mean of all sample vectors assigned to a cluster by the clustering algorithm, which is the case for centroid-based clustering algorithms using the Euclidean distance.

The computation of the 99% confidence interval for each component uses the fact that sample means are normally distributed and that the standard deviation of their distribution can be estimated by dividing the standard distribution of the data sample by $\sqrt{n}$ (where n is the sample size). For a normal distribution 99% of the data is covered by an interval extending 2.58 times to either side of the mean. We are using the 99% confidence interval of the sample mean as an estimate for the reliability of a performance model. The network operator can set thresholds in relation to the model prototypes which represent the average performance of a data transmission according to a model. For example, if a component of a confidence vector is larger than 10% of the equivalent component of a model prototype vector, the model can be deemed unreliable because the expected variation of from the mean is considered to be too large.

In addition to identifying prototypes through cluster analysis it is also possible to define pre-determined prototype models which represent default QoS models that the network operator wishes to offer to its clients. For these prototypes, it is only necessary to compute confidence vectors and these vectors are not then changed using cluster analysis.

Once the performance models have been identified through clustering or by pre-determination, we label each entry in the training database with the closest performance model (or a number of closest performance models in the case when using a fuzzy clustering approach). In the next step we identify which routes through the network are associated with which performance model and how close the traffic on each route matches the associated performance models. By using the labelled entries in the training database we assign a list of performance models to each route R by using the following criteria for each performance model $P_i$:

1) Sufficient Evidence: Were there at least $t_{min}>0$ transmissions on R that have been mapped to $P_i$? (this threshold $t_{min}$ is set by the network operator)
2) Sufficient Quality: Is the confidence vector $c_i$ computed from the transmissions on R mapped to $P_i$ good enough, i.e. are the components of $c_i$ smaller than a threshold specified by the network operator?

After this assignment has been completed, we have obtained a list of performance models and their qualities for each route through the network. It is possible that there will be routes with no assigned performance models. This can happen because there is not enough traffic on a route and therefore insufficient evidence to be able to assign a model to the route. It is also possible that the traffic on a route is so diverse that it does not match any performance model sufficiently closely so any model mapped to the route would not provide adequate quality. The network operator would not be able to make any QoS guarantees for such routes determined in this manner. The QoS guarantees for such routes could follow conventional approaches such as classic DiffServ QoS models. Alternatively, the operator could decide to compute a bespoke model $P_R$ that represents the average QoS conditions on this route R and offer guarantees according to the confidence vector $c_R$ for this model. In this case $p_R$ would not be obtained through clustering but simply by averaging the vectors $t_k^{(R)}$ for the transmissions on R.

After performance models have been assigned to routes through the network, the available bandwidth for each route and each performance model can then be determined. This can be done by computing the amount of traffic that has been carried over each route in the past and how it was distributed over each of the assigned models. Alternatively, the network may maintain a single capacity per route and manage capacity across models instead of per model.

The network gateway 130 re-runs this algorithm in regular intervals set by the network operator, e.g. every hour. In between the re-runs the network gateway collects traffic data and adds it to the training database. Old entries in the training database are removed (or alternatively marked as being invalid and then removed after a period of remaining invalid) after a period of time to make sure that the algorithm does not use outdated information. After each re-run the network gateway compares the new performance models to the current performance models and updates the model database. If a new model is very similar to a previous model the network gateway may decide to retain the old model instead. The similarity is based on the Euclidean distance between the model prototype vectors and the operator will set a threshold for an acceptable distance for which two prototype vectors would be considered similar enough to represent the same model. This procedure avoids rapid changes in advertised models if the performance differences would not be significant.

The network gateway stores all models in a model database M and in a Model-Route mapping Table MR. The model gateway also collects and updates statistics for all models and routes by monitoring all traffic that traverses the network mapped to any performance model in regular intervals as defined by the operator, for example every 10 minutes. All traffic flows are counted for each performance model and capacity is then calculated for each model. This is done for each model overall in M and per model and route in MR. The values in MR are used for the decision if a flow can be admitted on a route R using a particular performance model. The bandwidth available to a model on a particular route and the confidence vector of a model will be regularly updated based on traffic monitoring and predictive values can be computed based on historic data and a predictive model, for example, linear regression or a neural network (M Berthold & DJ Hand, "*Intelligent Data Analysis*", Springer, Berlin, 1999).

The training data table T contains entries representing the QoS of all end-to-end data transmissions within a given time period. The operator configures for how long historic traffic flows remain in T and the duration should reflect an expected period of stability for the network where the operator does not expect routes or traffic patterns to change substantially. If the operator wishes to build a time-dependent predictive model for the reliability and capacity of models then the duration should reflect this, for example 24 hours or 1 week. The following discussion assumes a duration of 24 hours.

A traffic flow is entered into T as soon as it enters the network. The statistics of a flow are updated when the flow ends or on a periodic basis, for example every 20 minutes. Flows that last longer than the update period will be entered into the training table T again such that T contains a representation of all statistical features of a flow over time. Rows 1 and 4 in Table 1 below illustrate this. A flow on route 1 started at time 13.00 and completed at time 13.38 leads to the creation of two rows of statistics in T. If a flow has entered the network using a particular performance model this is also recorded in T.

TABLE 1

Extract from the training data table T at 14:00 on 20/03/2015

| ID | Route | $t_s$ | $t_e$ | Throughput (Mbps) | Jitter (ms) | Loss (%) | Delay (ms) | Model |
|----|-------|-------|-------|-------------------|-------------|----------|------------|-------|
| 1 | 1 | 13.00 | 13.20 | 9.88 | 3.053416 | 0.148704 | 24.72323 | 1 |
| 2 | 2 | 13.05 | 13.15 | 10.18 | 3.030675 | 0.150843 | 25.04373 | 1 |
| 3 | 3 | 13.00 | 13.20 | 9.81 | 2.955859 | 0.15138 | 24.61943 | 1 |
| 4 | 1 | 13.20 | 13.38 | 9.84 | 2.989925 | 0.151806 | 24.64379 | 1 |
| ... | ... | ... | ... | ... | ... | ... | ... | ... |

The model database M contains an entry for each model that has been discovered by the learning algorithm. The network gateway uses the model database M to decide how long a model will be kept active for and whether new models should be accepted into M. The network gateway records all global statistics for each model in M, i.e. statistics across the whole network. The confidence vector and the number of flows (cluster support) indicate how reliable and how well supported by traffic a model is, respectively. When a new model has been identified it is compared against all entries in M and if the distance to any prototype is smaller than the operator defined threshold the new model is discarded.

The number of traffic flows that were assigned to the model and their accumulated bandwidth can be used as indicators when a model is no longer used and should be retired. In the same manner the confidence vector can be used to decide if the reliability of a model is no longer sufficient and that it should be removed.

TABLE 2

Extract from the Model Database M at 14:00 on 20/03/2015

| | Base Data | | | Capacity | Global Statistics | | | |
|----|-----------|------------|------------|----------|--------|-------|----------------|--------|-----|
| ID | Prototype | Confidence | Created | [Mb/s] | Routes | Peak Flows | Peak Demand [Mb/s] | 1 hr Flows | ... |
| 1 | (3.1, 0.1521, 25.15) | (0.0280, 0.0015, 0.2193) | 20/03/2015 12:00 | 200 | 3 | 24 | 153 | 13 | ... |
| 2 | (4.00, 0.1003, 29.76) | (0.0395, 0.0008, 0.2235) | 20/03/2015 14:00 | 150 | 3 | 0 | 0 | 0 | ... |
| 3 | (2.50, 0.1995, 19.90) | (0.0211, 0.0017, 0.1905) | 20/03/2015 14:00 | 300 | 3 | 0 | 0 | 0 | ... |
| ... | ... | ... | ... | | ... | ... | ... | ... | ... |

The model-route mapping table MR lists all routes with all models assigned to them. The statistics in the model-route mapping table are the same as those in the model database, but they are computed on a per route basis. The model-route mapping table MR is used by the network gateway to decide which model can be offered on which route. A model that is not sufficiently reliable or which is not used regularly can be removed from the model-route mapping table. New models are inserted into the model-route mapping table once they have been inserted into the model database. Similarly, a model will be removed from the model-route mapping table when it is removed from the model database.

TABLE 3

Model-Route Mapping Table MR at 14:00 on 20/03/2015

| | Base Data | | | Route-based Statistics | | | |
|---|---|---|---|---|---|---|---|
| Route | Model ID | Route Confidence | Active since | Capacity [Mb/s] | Peak Flows | Peak Demand [Mb/s] | ... |
| 1 | 1 | (0.0280, 0.0015, 0.2193) | 20/03/2015 12:00 | 100 | 8 | 82 | |
| 2 | 1 | (0.0280, 0.0015, 0.2193) | 20/03/2015 12:00 | 50 | 9 | 48 | |
| 3 | 1 | (0.0280, 0.0015, 0.2193) | 20/03/2015 12:00 | 50 | 7 | 23 | |
| 4 | 2 | (0.0395, 0.0008, 0.2235) | 20/03/2015 14:00 | 200 | 0 | 0 | ... |
| ... | ... | ... | ... | ... | ... | ... | |
| 9 | 3 | (0.0211, 0.0017, 0.1905) | 20/03/2015 14:00 | 100 | 0 | 0 | ... |
| ... | ... | ... | ... | ... | ... | ... | |

The network performance data can be analysed to determine one or more cluster centres. These can then be used as the basis for the QoS SLAs that are offered over the network. For example, if the cluster centre denotes a traffic SLA of $$\{delay, jitter, loss\} = \{20 \text{ ms}, 2 \text{ ms}, 0.1\%\}$$

with 4 routes having a performance profile that can support this for time T into the future, this SLA is advertised with a specific DSCP or ToS codepoint which can be used by traffic flows that wish to be delivered with this SLA. The repository of such advertisements can be held at a known location such as an edge router, a session admission unit, a bandwidth broker or at a network interface between a client site and the network itself.

A client will determine the closest match to their required SLA from one of the advertised QoS SLAs at a particular time and mark their packets in the IP layer according to the behaviour they would like from the network. This involves computing the similarity of a requested QoS against an offered QoS, which can either be done by the client or by a translation device, for example the network gateway or another device managed by the network, aware of the client's QoS requirements on a per application or service type basis. Alternatively, acceptable boundaries of QoS can be pre-determined by the service provider on a service by service basis in by specifying a set of performance parameters for each application type, for example in the form of: application type, (minimum throughput required, lower jitter boundary, upper jitter boundary, lower delay boundary, upper delay boundary, lower RTT boundary, upper RTT boundary). Alternatively, this information could be represented as a percentage tolerance from the ideal QoS requirements. If such strict boundaries are not pre-defined, the network interface to the client may use a similarity function to determine the most appropriate QoS required for the specific service request.

It will also be noted that the learning algorithm uses both automatic cluster centre discovery as well as clustering around fixed cluster centres. The fixed cluster centres could correspond to conventional EF/AFx/DE QoS SLAs in order to provide backwards compatibility with clients that are unaware of the adaptive CoS system and would prefer to opt for model of pre-purchased throughput at a given SLA. It could be network policy that such routes that offer SLAs corresponding to the traditional DiffServ model retain these routes specifically for clients that request classic DiffServ. Alternatively, classic DiffServ can be perceived merely as further options for services to choose from in addition to the dynamic ones and opt for them if they so desire. Policies on filtering out specific QoS SLAs options to specific clients are left to the discretion of the operator.

The client may choose to define a local Forwarding Equivalence Class (FEC) that maps services onto QoS requirements and map the FEC onto the DSCP value that delivers this QoS requirement at that specific time of data transfer. Similar to the concept of FEC, the packets may not be of the same application or service or indeed have the same source/destination pair. Packets marked with the same DSCP value will be treated by the same way by the network. The client (or network interface entity), having decided what QoS is desired for a given service type at a specific time using this FEC-like mapping, marks the IP packets accordingly. This marking is then used by the network to route traffic as requested.

Unlike the conventional model of purchasing bandwidth in advance, the present method provides a more real-time 'shop window' style approach. Applications can now have time-variant QoS requirements and make use of the number of QoS SLA options offered. Clients can choose a different QoS SLA if a previously chosen SLA is no longer necessary. This might be the case when a client monitors end-to-end performance (e.g. arising from traffic traversing several network segments of which the present system offering dynamic CoS is one) and finds that they can opt for a lower CoS at a lower price if end-to-end performance is still satisfied across all the segments. The same applies to aggregates of traffic from a single large customer—different varieties of traffic are sent at different times of day and it might be more suitable to opt for a different CoS at different times, depending on the type of traffic being sent. Some applications might not be subject to stringent QoS SLAs but would require some QoS guarantee and can choose one of the available QoS options accordingly, trading off cost with performance in real-time and on a more granular basis. Pricing may be done in real-time based on usage rather than pre-determining what usage might look like and subsequently sending too much or too little traffic. This approach of demand management is similar to ordering groceries from a shop in real-time as the need arises, subject to current conditions, instead of periodically in advance and risking having too much left over or of running out.

The next task is to assign DSCP values to the generated prototypes. In this example, all 21 prototypes will be offered as individual DSCP values. Such values can indeed be generated sequentially or at random as long as they can be represented by the four available bits (or six if ECN is not used). Additional considerations for generating DSCP values are given below:

1) Reserve classic DiffServ DSCP values for clusters that offer the pre-defined QoS of classic DiffServ. This maintains backwards compatibility with clients that require an understanding of classic DiffServ and mark their IP packets with the pre-defined codepoints.
2) Generate DSCP values to reduce the possibility of errors, for example by generating values with maximum Hamming distance between them, that are within the acceptable range and do not correspond to classic DiffServ codepoints.
3) The generator of DSCP values can resist using values that are currently in use. This is useful if a mapping of current DSCP values to services is not done but the operator would like continuity in service flow across multiple iterations of the principal learning process. If a table of mapping between client source/destination, DSCP values, QoS features, route(s) and load distribution is maintained, then it might not be necessary to exclude values that are currently in use but instead update what the QoS features associated with those values mean in such a table.

Generating these DSCP values should be a routine matter for a person skilled in the art. The values may, for example, be generated by a software process which is executed by the network gateway. The DSCP values may be determined after the completion of the principal learning process. Once the DSCP values have been determined then the repository of available QoS models will be updated. This repository may be held by the network gateway. The DSCP value itself is only a concise lookup used by both client and the network to understand the more complex QoS features that a client desires and the network provides. Therefore, the look-up functionality can be performed by any other means, including explicit signalling in advance or any other QoS management protocol.

The second task to be performed following the completion of the principal learning process is to reserve resources for the QoS models on the respective pathways that have been determined to support them and associate these 'tunnels' with the DSCP values that have been generated in the preceding step for these QoS models.

This can be done with or without explicit reservation, MPLS with or without using DS-TE in the Maximum Allocation Model (MAM) or by using the Russian Doll Model (RDM). A single tunnel can be associated with a single DSCP value, multiple DSCP values can be mapped onto the same tunnel or indeed the same applies for sub-pools within a tunnel and their mapping to DSCP values. In the above example, a single tunnel is created for all dynamic QoS systems (tunnel bandwidth will be the sum of all bandwidths of the QoS models that are supported on that tunnel) and sub-pools were allocated, using MAM, to individual QoS models that are supported on the same route or link. We also associate one DSCP value to one QoS model. This means that one DSCP value can be mapped to multiple routes, each of which can be a sub-pool on a larger tunnel on a pathway (i.e. a collection of connected routers via links) that supports multiple QoS models. A single pathway will therefore only have one overall tunnel that encompasses all dynamic QoS routing, potentially leaving available bandwidth for other types of routing. Alternatively, separate tunnels can be established for every QoS model which means that a pathway can contain multiple tunnels. Each tunnel on a route is mapped to a single DSCP value with the possibility of multiple tunnels on many pathways being mapped to the same DSCP value. This denotes that multiple tunnels support the same QoS model which means that when a request arrives at the gateway with a DSCP value, the gateway has an option of more than one tunnel to which the incoming request can be assigned and/or distributed. Note that the gateway must then keep track of load distributions across multiple routes on the same QoS model as well as across different QoS models, which might be necessitated by the load balancer function described here. Note that this might result in a large number of tunnels on a single route and therefore the first approach of having a single tunnel per pathway and modifiable sub-pools within each tunnel to signify a QoS model (and therefore DSCP value) might be more suitable.

The system above describes a dynamic classes of service proposition where the operator and clients move away from the conventional set of EF/AFx/DE CoS to an environment where the classes of service offered vary with time, depending on a number of factors. We use a learning algorithm to determine what these classes of service SLAs should be and for how long they should be advertised on a dynamic 'scoreboard' from which clients choose their preferred classes of service. The extent to which the invention is self-discovering depends on the network operator.

The learning process described above with respect to the determination of the clusters will be referred to as the principal learning process. There will also be provided a secondary learning process which operates at a different timescale to that of the principal learning process. The secondary learning process addresses the transition issue in two parts in a dynamic QoS environment:

1) Identify and address degrading Quality of Service for services already admitted into the network
2) Identify and remap existing services across multiple learning iterations to address QoS continuity The solution to both of these challenges is subsequently also used to improve the accuracy of QoS models offered in the future. It is proposed, in addition to the methods described below, that when a QoS model is forecast to be unsustainable by the primary learning process after a time A, the model is withdrawn at that time, even if the next iteration of the learning method is at time T where T>A. A QoS model may be withdrawn from the scoreboard when its performance deteriorates even if this is before the next learning iteration.

There are two possible methods to determine a QoS breach. Both involve comparison of current performance to either the minimum and maximum performance thresholds specified by the client or a pre-defined threshold of what constitutes degradation which has been agreed between the operator and client. A dynamic set of minimum and maximum performance thresholds on a per-FEC/flow basis is available in the incoming QSPEC object as part of NSLP signalling, if this is used. The agreement of what constitutes a QoS breach can be done in any way. For example, once a specific flow request is mapped onto a DSCP value, the operator can choose to pre-define performance targets on a per-CoS basis, therefore ignoring the client initial reservation request (which could have been taken into account whilst assigning the client to a CoS at admission stage) at the risk of propagation errors as a single service is mapped repeatedly to multiple CoS models over time, each of which has its own breach conditions. It is also possible that service degradation is determined by a user-reported score of application performance, from which end-to-end network metrics can be derived to achieve this performance. Nevertheless, as an example, the minimum and/or maximum QoS requirements provided in the QSPEC object as part of NSLP are used as the chosen method of comparison simply because it is more dynamic, granular and less prone to errors over time. Alternatively, the acceptable QoS performance envelope of a service assigned to a model P can be taken to be the confidence vector c of the model P rather than that requested in the initiator QSPEC object.

Having defined what constitutes a QoS breach, it is now possible to determine when current service performance is at risk of reaching this threshold. For the traffic flow under consideration, the average QoS vector q over the last time period t can be determined by computing the average QoS components offered by the model assigned to the traffic flow. After computing the QoS vector(s) q for the service flow(s), it can be determined if it lies within the limits of p±c (where p is the model prototype and c is the confidence vector, as described above, or any other agreed performance envelope. Thus there is an SLA breach if at least one component of q is worse than the agreed threshold for that component.

If a breach of QoS is inevitable then the performance of the service will degrade unacceptably before the next iteration of the primary learning process takes place. There is a need for simplicity in the comparison algorithm. For example, if the primary learning process analyses network routes every hour, a service may be determined to degrade below the chosen QoS DSCP value on a shorter time scale, for example within the first 15 minutes. The more factors that are taken into account when determining service degradation then the more computationally intensive this process becomes. It is important that the method of comparing current performance with the SLA is not too time-intensive as this is key to the responsiveness of the secondary learning process. There is a trade-off to be made between time responsiveness and thoroughness of computation.

An aggregation of data flows can be deemed at risk of deterioration. For example, this can be some, or all, of the data flows from a particular client site, a subsection of traffic belonging to one or more applications, an entire tunnel with all its QoS models, a sub-pool delivering a single QoS performance amidst the global pool delivering different QoS performance. The determination of what constitutes a breach can be made collectively across one or more of these service 'flows' or on an individual basis against the original service request.

Once a QoS breach has been determined, then the first action to take is to stop advertising a particular QoS model to prevent new services from requesting this QoS SLA. Then it is necessary to deal with the existing services that arrive marked with the DSCP value from the previous iteration.

The next step to take is to trigger load balancing. It will be understood that any network load balancing application or set of policies may be used if they can meet the load-balancing requirements set-out below. The applicants co-pending applications WO2014/068270 and WO2014/068268 describe suitable load balancing mechanisms which may be used.

If a specific service flow (i.e. FEC/tunnel/sub-pool) has been determined to be deteriorating, then the target QoS for this service flow is retrieved from the model database M, along with network metrics such as telemetry data and service performance information corresponding to network routes. It is possible that data is stored on a link-by-link basis along with topology information for the load balancer to aggregate this across all links to compute the end-to-end route performance.

The load balancer then uses historical data about route performance to identify one or more routes to split the traffic across, if traffic can be split, and if those routes are allowed to carry such traffic, in a manner that results in the QoS target being achieved within acceptable boundaries. The load balancer functionality needs to take into account current and forecasted route performance to split the traffic in a suitable manner and achieve the end-to-end performance above the minimum target, which may be set by the application request itself.

The operator might propose that the load balancer should look to split traffic across routes of the same CoS before considering splitting across different CoS. The operator might also choose not to allow splitting of a single flow but instead allow migration of a flow entirely into another route or CoS. These are constraints that can be set for the load balancer but will either structure or limit the number of options available to recover from degrading performance.

The load balancer uses the current DSCP value to identify, from the data structures described above by the principal learning process, a list of possible routes of the same DSCP value. It then checks the performance forecasts and real-time progression of the other routes' performance and determines the best split (or migration) to a different route in order to achieve the QoS target it receives along with the load balance request. Alternatively, the load balancer looks across current classes of service to determine the best traffic distribution that achieves the same objective. The outcome of the load balancer is a list of re-mappings proposed that is predicted to achieve the respective required QoS targets for some or all of the degrading traffic.

TABLE 4

Outcome of load balancer process

| | | Current DSCP | | Future DSCP | |
| --- | --- | --- | --- | --- | --- |
| Session ID | Remap/Reject? | Value | % of traffic | Value | % of traffic |
| S1 | Remap | 48 | 100 | 46 | 60 |
| S1 | Remap | 48 | 100 | 36 | 40 |

Table 4 above shows an example of the results obtained from the application of the load balancing process. It can be seen that a single dynamic class of traffic (DSCP 48) has been mapped into two different classes (60% at EF and 40% at AF4 Med Drop). Note that it is possible to map any dynamic CoS to any dynamic CoS or pre-defined classic DiffServ CoS, unless the network operator places restrictive policies on such mappings.

The load balancer may not succeed with the load balancing, in which case the service might be rejected or continued to be transmitted at lower QoS. As an alternative, the load balancer may return a set of tunnels (or sub-pools) to map a single CoS to, from which the DSCP values can be derived using the data store described above The next step is to re-label the incoming traffic according to the new, split mapping. The mapping information of tunnels to DSCP values is used here to find either the corresponding DSCP values (if tunnel information is returned by the load balancer) or the respective first hop for the set of tunnels that are identified to support a given DSCP value (if the load balancer returns a list of DSCP values for re-mapping). This remapping can be done internally and without communication with the client and maintained for as long as the given session is in progress. Alternatively, the client can be triggered to re-negotiate if the load balancer fails or if several load balance triggers are generated within a short period of time. We propose that the re-mapping is done within the network gateway. Note that the network infrastructure (tunnels, DSCP values) has not been changed by the secondary learning process. This change can only be made by the principal learning process in the next iteration of CoS discovery. The secondary learning process is only responsible for a shorter term remapping of existing services to a different CoS using a load balancer function in order to prolong the service quality experienced by a given traffic flow. The network gateway therefore maintains a temporary store of re-mapping data, having the same structure as that shown in Table 1 above, which it updates when the session ends.

A further issue concerns continuity challenges across subsequent iterations of the principal learning process. If it is determined that a particular CoS is no longer supported in the current iteration, then a suitable remapping must be found for existing services that have requested this CoS so that the guarantee of QoS remains for the duration of the session. It is possible that the operator chooses not to add this complexity to the dynamic CoS model but this does lend the system 'stateless' every time the principal learning process determines a new set of CoS.

The first step is to determine which classes of service are no longer supported and which flows use these CoS. This mapping should be maintained in a data structure used by the principal learning process. Comparing the current list of DSCP values, their associated routes and the SLA associated with the DSCP values to the new set allows the identification of the DSCP values which have changed in SLA meaning and which have been discontinued (including the DSCP marking itself). A DSCP value can be used for two different QoS classes in subsequent iterations of the principal learning process and the network gateway will need to map existing services to the new set of CoS.

Once this list of services, or aggregate of service flows, has been determined, the initial QoS SLA is retrieved from the NSLP signalling request. This information completes the necessary context required for the load balancer to be triggered in the same way as discussed above. The load balancer returns a list of re-mappings which is then implemented as DSCP changes, with or without explicit signalling to the client to communicate this change. Note that this must be done for every DSCP/QoS model that is withdrawn after each learning iteration.

As the primary learning process discovers cluster centres of QoS performance at every iteration, we do not wish to learn such behaviour in the next iteration. Therefore, we propose that a key action of the network gateway once such remapping has taken place for a given service flow(s) is to remove these service entries from the historical data used by the primary learning process in clustering.

FIG. 2 shows a graphical depiction of a scenario in which the primary learning process runs at time T, at which point a set of dynamic CoS have been advertised. The service S1 requesting a CoS of 48 has been admitted at subsequent time T+x. Subsequently it has been determined that S1 is at risk of degradation and thus it has been remapped at time T+y to DSCP 46 and DSCP 36 (see Table 4 above). The thickness of the line in FIG. 2 represents the load from S1 on the DSCP value—the thickest line denotes 100% load on DSCP 48, whereas the line of medium thickness represents 60% load on DSCP 46 and the thinnest line represents 40% load on DSCP 36. S1 then terminates at time T+z, which occurs prior to the next iteration of the primary learning process at time 2T. It is evident that even though the service flow may have received the CoS treatment it requested at admission time, it is the remapping and the collective performance of DSCP 46 and DSCP 36 that has enabled this. Therefore, S1 is removed from the list of service flows analysed in the next iteration so as to not reinforce the QoS model associated with DSCP 48. However, since the service was delivered successfully in DSCP 46 and DSCP 36 at 60% and 40% traffic distribution respectively, this data can be retained in service flow information to reinforce the QoS models associated with DSCP 46 and 36. Note also that the remapping decision, associated context data and its outcome will be recorded by the load balancer entity for future learning. Therefore, this enhancement to the original dynamic QoS system provides the required continuity across learning iterations as well as a more real-time monitoring of agreed QoS.

Assume that there are six sessions S1, S2, S3, S4, S5 and S6. All these 6 sessions arrive from a single client having the IP address 10.12.0.1 and desire the same QoS treatment, denoted by a single FEC and a single DSCP value V1 (e.g. 48). This particular DSCP value might not correspond to a pre-defined classic DiffServ codepoint and therefore might signify a dynamic QoS model as described above. Note that the client need not be an actual end client but instead may comprise an interface that negotiates on behalf of a number of clients or a sub-network represented with a subnet mask. Assume that the following repository is kept at the network gateway, mapping the six sessions to routes in the network:

TABLE 5

Sample repository of session mapping to DSCP values and associated QoS features as well as models and corresponding routes

| Session ID | Source | Destination | Model ID | Route ID | Load on route (%) | QoS Features | Current DSCP value |
|---|---|---|---|---|---|---|---|
| S1 | 10.12.0.1 | 10.12.1.1 | 1 | 15 | 100 | {J1, L1, D1} = {3.1, 0.15, 25.2} | 48 |
| S2 | 10.12.0.1 | 10.12.1.1 | 1 | 16 | 100 | {J1, L1, D1} = {3.1, 0.15, 25.2} | 48 |
| S3 | 10.12.0.1 | 10.12.1.1 | 1 | 15 | 100 | {J1, L1, D1} = {3.1, 0.15, 25.2} | 48 |
| S4 | 10.12.0.1 | 10.12.1.1 | 1 | 16 | 100 | {J1, L1, D1} = {3.1, 0.15, 25.2} | 48 |
| S5 | 10.12.0.1 | 10.12.1.1 | 1 | 15 | 100 | {J1, L1, D1} = {3.1, 0.15, 25.2} | 48 |
| S6 | 10.12.0.1 | 10.12.1.1 | 1 | 15 | 100 | {J1, L1, D1} = {3.1, 0.15, 25.2} | 48 |

The QoS Features column denotes what has been agreed between the client and the network. In the absence of an initiator QoS, or if further negotiation has taken place to amend the original request, this column can be copied from the features associated with the QoS model 1. Alternatively, the QoS features can refer to the requirements signalled in the Initiator QSPEC or the original reservation message. The idea is to obtain what has been agreed upon, whether that is assumed to be from the client directly or from the network if further changes have taken place.

It is also assumed that all six sessions originate and terminate at the same pair of IP addresses. This is not necessary and further complexities in diversity of source-destination combination are addressed by the load balancer itself and therefore do not form part of this invention. The same applies to current load distribution of sessions over a number of routes. Whilst a single session is assumed to not be distributed across multiple routes, as 100% of the load of each session is carried over the associated route, this is not strictly necessary if the session can be load balanced across multiple routes. Additionally, this example shows two routes (15 and 16) that support a single QoS model. Any number of routes can support a single QoS model and the complexity that rises from this is also handled by the load balancer as it only increases the number of options the load balancer has to transfer deteriorating traffic away from its current route(s).

The first step is to identify QoS breaches for sessions S1-S6 against their SLAs. For example, we assume that in this embodiment, a deviation of 10% or more from one of the components of the prototype (i.e. QoS Features column in Table 5) is considered unacceptable. Using performance data collected about the performance of S1-S6, we can determine whether these services are likely to deviate from their agreed QoS.

Assume that it has been determined that whilst sessions S1, S3, S5 and S6 are performing sufficiently well against their SLAs, S2 and S4 are likely to not meet SLA targets, for example through experiencing congestion. Whilst such under-performance will be recorded by the primary learning process, potentially leading to the route 16 being removed from QoS model 1, the secondary learning process must now react in order to avoid this situation if possible. This is the advantage of having such a secondary learning process that handles deteriorating conditions instead of letting the primary learning process revise its QoS models for future sessions at the expense of existing sessions.

Having information about potential under-performance, the next step for the secondary learning process is to trigger the load balancer. The load balancer is triggered and has access to two types of information. The first is flow information, which is as shown in Table 5. This allows the load balancer to know which flows to remap, what their required QoS is and also which routes they currently occupy (which can then be excluded from the list of potential routes). The second type of information is about real-time performance of available tunnels. This information characterises a number of performance metrics associated with other routes (i.e. tunnels) are collected as close to real-time as possible in the form of telemetry information using SNMP, OSPF LSAs or otherwise. A number of data collection and aggregation protocols exist to perform this task. In this specific example, this information could relate to predicted jitter, loss and delay of other tunnels as well as information about other services on them. It will be understood that such data might already be collected for other network intelligence applications on the same network or indeed for use by the primary learning process in the next iteration of the clustering mechanism. The same information used by the primary learning process is applicable here.

The load balancer has been constrained in this example to only seek routes that offer the same or better performance for the entire collection of traffic, irrespective of how it is load balanced across these routes. This means that S2 and S4 can be split only over routes that support QoS model 1 or better (i.e. jitter, loss, delay values are better than QoS model 1). The load balancer cannot split traffic to a different route that performs worse than the expected QoS SLA even if it is only used for a small load as this becomes a challenge to manage end-to-end. The network operator may choose not to have this constraint and allow sessions to be routed through any available tunnels as long as the aggregated end-to-end performance is as expected for QoS model 1. Further constraints may be imposed by the load balancer function. For example, a route may only be chosen if the transfer of service flows to it do not have an impact on existing services. A route's forecasted performance is also corroborated against past historical performance under similar conditions to minimise errors in forecasting as well as likelihood of detriment on the new route(s). We also do not allow a single session to be load balanced across multiple routes as this might interfere with higher-layer functions such as TCP and potentially cause re-ordering issues. Any other constraint can be placed on the load balancer to aid its search for a different pathway for the sessions S2 and S4.

Using these two types of information, the load balancer now discovers a load distribution that optimises QoS performance for QoS model 1 for sessions S2 and S4. If the load balancer is unable to find an alternative set of pathways, the session might be rejected or the operator might have to compensate the client for the period of detriment as is customary in current networks. Alternatively, the load balancer is able to find alternative routes 18 and 19 onto which S2 and S4 can be re-mapped respectively. It is possible that if more than two sessions were identified for re-mapping, more than one session is re-mapped onto the same route. One possible outcome of the load balancer is shown below in Table 6:

TABLE 6

Exemplary route balancer data

| Session ID | Remap/Reject? | Current DSCP | | Future DSCP | |
| --- | --- | --- | --- | --- | --- |
| | | Value | % of traffic | Value | % of traffic |
| S2 | Remap | 48 | 100 | 46 | 100 |
| S4 | Remap | 48 | 100 | 36 | 100 |

Note that in this embodiment, the load balancer does not specify to which routes the Future DSCP values correspond. It is assumed in this instance that the mapping between DSCP values and routes has already been done by the primary learning process. Alternatively, the load balancer can specify the routes following which the corresponding DSCP values must be determined. In this example, once the re-mapping has been determined by the load balancer, incoming services with a DSCP value of 48 will be remapped to 46 if the packets belong to S1 and from DSCP value 48 to 36 if the packets belong to S2. It can be assumed that remapping has been successful and therefore, S2 and S4 will henceforth be transferred over different routes, where they were previously sharing the same route. If a session re-map has been unsuccessful, the second column of Table 6 will be updated to 'reject'; subsequently the client must be informed of this rejection, potentially triggering re-negotiation from the client side to determine if the session is to continue.

The second instance where the secondary learning process is triggered is during changeover between one iteration of the primary learning process and the next. In this case, the secondary learning process can identify the list of withdrawn models and also determine from a table, such as that exemplified in Table 5, if there are any services currently consuming the withdrawn QoS model. Once this itemization has been made, the secondary learning process has a list of sessions that must now be re-mapped and performs exactly the same way as explained earlier. It can be understood that the list of sessions to remap is generated based on forecasted deterioration in one instance and based on withdrawn models in the second instance but the steps following the identification of such services is common to both instances.

The re-mapping of services is considered to be a temporary measure rather than a permanent solution. Therefore, whilst the network gateway maintains a remap list as shown in Table 6 or the existing services, the session information relating to re-mapped sessions is removed from the principal learning process. This is to ensure that such 'firefighting' behaviour is not assumed to be the norm by the primary learning process and therefore does not reinforce this behaviour in the future. Nevertheless, if S2 and S4 continue to be successfully transmitted over routes 18 and 19 using DSCP values of 46 and 36 respectively, this session information is recorded as successes against these QoS models and associated routes in order to reinforce them at the next iteration of the primary learning process.

There are different types of cluster analysis that can be used to learn model prototypes. We use a centroid-based clustering method like k-means clustering or variations thereof such as fuzzy c-means clustering (F Höppner, et al "*Fuzzy Clustering*", Wiley, 1999). Centroid based clustering uses a fixed number of cluster centres or prototypes and determines the distance of each data vector from a training database to each prototype. The distances are then used to update each prototype vector and move it close to the centre of the group of data vectors it represents. Different types of clustering algorithms use different distance measures and different ways of assigning a data vector to a prototype. K-means uses Euclidean distance and assigns each data vector to its closest prototype. Fuzzy c-means assigns each data vector to all prototype vectors to a degree such that the membership degrees add up to 1.

It will be understood that the method of the present invention may be implemented by executing computer code on a general purpose computing apparatus. It should be understood that the structure of the general purpose computing apparatus is not critical as long as it is capable of executing the computer code which performs a method according to the present invention. Such computer code may be deployed to such a general purpose computing apparatus via download, for example via the internet, or on some physical media, for example, DVD, CD-ROM, USB memory stick, etc.

The present invention is not primarily concerned with load balancing and the specific load balancing mechanism used is not relevant to the operation of the present invention. The invention concerns a method of gracefully withdrawing one or more classes of service, specifically addressing the consequences of time-variance in the dynamic QoS environment as well as the lack of continuous monitoring for existing services in this context. Load balancing has been used as one possible method to achieve stability for as long as possible in a remedial fashion till the next iteration of the principal learning process occurs. The dynamic nature of offered classes of service adds complexity around the load balancing action. It only uses a load balancer to achieve a different goal in the context of an environment where the classes of service offered varies with time and existing services must be transitioned in the time between and across iterations.

In one aspect, the present invention provides a method of operating a communications network, in which a primary learning process periodically determines which routes communications sessions are assigned to in order that the session can be carried with a requested QoS. A secondary learning process is used, in between instances of the primary learning process to check that the QoS constraints are still satisfied. If not, action is taken, for example using a load balancer to transmit the session over one or more further network routes.

The invention claimed is:

1. A method of operating a communications network, the method comprising the steps of:
   a) executing a first learning process to learn performance models from historic traffic data carried over the communications network, assign the performance models to a plurality of routes through the network and offer quality of service (QoS) measures for the communications network based on the learnt performance models, wherein each of the performance models comprise a first vector representing the average value of one or more transmission parameters and a second vector representing the variation of the average value of the one or more transmission parameters;

b) allocating a communication session to one or more of the plurality of routes through the communications network, the allocation of a session to a network route being made in accordance with a requested one of the offered QoS measures;

c) subsequently executing a second learning process to determine if the QoS measure will be breached prior to a further instance of the first learning process being executed; and d) if the result of the second learning process indicates that the QoS measure will be breached, re-allocating the communication session to one or more further routes through the communications network wherein the one or more further routes are able to satisfy the requested QoS measure.

2. A method according to claim 1, wherein if the result of the second learning process indicates that the QoS measure will be breached then the communication session is divided into two or more parts, with each of the session parts being re-allocated to a respective further route through the communications network.

3. A method according to claim 1, wherein in the second learning process re-allocates the communication session to one or more further routes through the communications network which have the same class of service as the routes to which the session was allocated in the first learning process.

4. A method according to claim 1, wherein in the second learning process re-allocates the communication session to one or more further routes through the communications network which have a different class of service from the routes to which the session was allocated in the first learning process, but for which it is predicted that the requested QoS measure can be satisfied until the next instance of the first learning process is executed.

5. A method according to claim 1, wherein the second learning process is executed more than once in between successive instances of the first learning process.

6. A method according to claim 1, the method comprising the further step of:

e) if in step d) there are no further routes through the communications network which can satisfy the requested QoS measure, making no further change to the communication session.

7. A method according to claim 1, the method comprising the further step of:

e) if in step d) there are no further routes through the communications network which can satisfy the requested QoS measure, terminating the communication session.

8. A method according to claim 1, the method comprising the further step of:

e) if in step d) there are no further routes through the communications network which can satisfy the requested QoS measure, re-allocating the session to one or more further communication routes which can provide an improved quality of service.

9. A non-transitory data carrier device comprising computer executable code for performing a method according to claim 1.

10. An apparatus comprising a computer for executing computer code such that the apparatus is at least configured to:

a) execute a first learning process to learn performance models from historic traffic data carried over the communications network, assign the performance models to a plurality of routes through the network and offer quality of service (QoS) measures for the communications network based on the learnt performance models, wherein each of the performance models comprise a first vector representing the average value of one or more transmission parameters and a second vector representing the variation of the average value of the one or more transmission parameters;

b) allocate a communication session to one or more of the plurality of routes through the communications network, the allocation of a session to a network route being made in accordance with a requested one of the offered QoS measures;

c) subsequently execute a second learning process to determine if the QoS measure will be breached prior to a further instance of the first learning process being executed; and d) if the result of the second learning process indicates that the QoS measure will be breached, re-allocate the communication session to one or more further routes through the communications network wherein the one or more further routes are able to satisfy the requested QoS measure.

11. A communications network comprising a plurality of nodes, a plurality of communications links inter-connecting the plurality of nodes, and a network gateway, the communications network being configured to, in use, at least perform:

a) executing a first learning process to learn performance models from historic traffic data carried over the communications network, assign the performance models to a plurality of routes through the network and offer quality of service (QoS) measures for the communications network based on the learnt performance models, wherein each of the performance models comprise a first vector representing the average value of one or more transmission parameters and a second vector representing the variation of the average value of the one or more transmission parameters;

b) allocating a communication session to one or more of the plurality of routes through the communications network, the allocation of a session to a network route being made in accordance with a requested one of the offered QoS measures;

c) subsequently executing a second learning process to determine if the QoS measure will be breached prior to a further instance of the first learning process being executed; and d) if the result of the second learning process indicates that the QoS measure will be breached, re-allocating the communication session to one or more further routes through the communications network wherein the one or more further routes are able to satisfy the requested QoS measure.

* * * * *